United States Patent [19]

Aoshima

[11] Patent Number: 4,777,508

[45] Date of Patent: Oct. 11, 1988

[54] EXPOSURE CONTROL DEVICE FOR CAMERA OF VARIABLE FOCAL LENGTH TYPE

[75] Inventor: Chikara Aoshima, Kanagawa, Japan

[73] Assignee: Canon Kabushiki Kaisha, Tokyo, Japan

[21] Appl. No.: 931,809

[22] Filed: Nov. 18, 1986

[30] Foreign Application Priority Data

Nov. 25, 1985 [JP] Japan .................... 60-180993[U]
Nov. 25, 1985 [JP] Japan .................... 60-180994[U]

[51] Int. Cl.$^4$ .................... G03B 3/00; G03B 7/099
[52] U.S. Cl. .................... 354/479; 354/481; 354/195.1
[58] Field of Search .................... 354/195.11, 459, 481, 354/479, 195.1

[56] References Cited

U.S. PATENT DOCUMENTS

| | | | |
|---|---|---|---|
| 3,522,763 | 8/1970 | Dietz | 354/459 |
| 4,122,466 | 10/1978 | Iwata | 354/431 X |
| 4,159,864 | 7/1979 | Yasukuni | 354/195.11 X |
| 4,349,258 | 9/1982 | Kitai et al. | 354/191.11 X |
| 4,451,129 | 5/1984 | Ikari et al. | 354/195.12 X |

Primary Examiner—Michael L. Gellner
Attorney, Agent, or Firm—Fitzpatrick, Cella, Harper & Scinto

[57] ABSTRACT

There is disclosed an exposure control device for a camera having a photographic lens of variable focal length type which includes exposure control means for controlling an exposure on the basis of a light coming from an object to be photographed and passing through an optical path different from that of the photographic lens and correcting means for correcting said exposure control means to correct the exposure depending upon a change of an open F-number of the photographic lens caused by a variation of the focal length, by changing a resistance value of a variable resistor or a length of the optical path for measuring the light in response to the variation of the focal length of said photographic lens.

11 Claims, 3 Drawing Sheets

EXPOSURE CONTROL DEVICE FOR CAMERA OF VARIABLE FOCAL LENGTH TYPE

BACKGROUND OF THE INVENTION

1. Field of the Invention

The present invention relates to an exposure control device for a camera having a photographic lens of variable focal length type which includes means for detecting a luminance of an object to be photographed and means for automatically controlling an exposure in accordance with the luminnnce detected by said detecting means.

2. Description of the Related Art

In general, in a camera having a photographic lens of variable focal length type, an open F-number of the photographic lens changes, depending upon a variation of the focal length. Accordingly, in case of a camera having an automatic exposure control device of the type in which a luminance of an object to be photographed is directly measured on the basis of a light which has not passed through a photograhic lens, it is necessary to correct the automatic exposure control device, depending upon the variation of the focal length of the photographic lens.

Heretofore it has been proposed to provide a correcting system for correcting the automatic exposure control device in which a light guide, a shielding slit or a filter is disposed at the front of a light measuring element to increase or decrease a quantity of light incident thereon, thereby effecting the correction of the automatic exposure control in response to the change of the open F-number of the photographic lens caused by the variation of the focal length thereof. (For example, see U.S. Pat. No. 4,451,129).

In such correcting system, however, the provision of the light guide, the shielding slit or the filter, which is required to be driven into or out of an optical path of a light measuring element, causes such disadvantage that the light guide, the shielding slit or the filter used is very complicated in shape and a driving mechanism or other accessory mechanism required therefor is also very complicated, so that a cost of a product is increased, a very high precision is required and a large space is required.

It has been also proposed to provide a correcting system including a movable member which moves depending upon the variation of the focal length of the photographic lens, an electric switch arranged to be turned on or off by the movement of said movable member and an electric circuit which receives an electric signal from the electric switch to correct the automatic exposure control device. (For example, see Japanese Laid-Open Patent Application No. Sho 58-182623.)

This correcting system, however, has such disadvantage that when it is applied to a lens, such as a zoom lens, in which its open F-number makes continuous change, it is required to divide the changing range into a number of sections as required to obtain a desired precision of correction and to effect corrections of respective ones of the representative open F-numbers.

In this case, the number of the switches (number of contact pieces) is increased, so that wiring of the number of switches causes many troubles in view of their number as well as volume and further provides problems in cost, reliability and precision.

SUMMARY OF THE INVENTION

It is an object of the present invention to provide an exposure control device for a camera of variable focal length type in which the correction of the exposure control depending upon the change of the open F-number of the photographic lens caused by the variation of the focal length thereof can be effected by a simple construction and even when continuous or multistage correction is required such as in case of a zoom lens the correction of the exposure control can be effected in simple and reliable manner by a compact construction.

In order to attain such object, the present invention provides an exposure control device for a camera having a photographic system of variable focal length type which comprises exposure control means for controlling an exposure on the basis of a light coming from an object to be photographed and passing through an optical path different from that of the photographic system and correcting means for correcting said exposure control means to correct the exposure depending upon a change of an open F-number of said photographic system caused by a variation of the focal length, by changing a resistance value of a variable resistor or a length of the optical path for measuring the light in response to the variation of the focal length of the photographic system.

The other objects of the present invention will be understood from the explanation which will be made with reference to the drawings.

BRIEF DESCRIPTION OF THE DRAWINGS

FIGS. 1 and 2 are sectional views showing a first embodiment of the camera according to the present invention, in which FIG. 1 illustrates a state where a photographic lens is situated at its longer focal length side and FIG. 2 illustrates a state where the photographic lens is situated at its shorter focal length side.

FIGS. 4 and 5 are sectional views showing a second embodiment of the camera according to the present invention, in which FIG. 4 illustrates a state where a photographic lens is situated at its longer focal length side and FIG. 5 illustrates a state where the photographic lens is situated at its shorter focal length side.

DETAILED DESCRIPTION OF THE PREFERRED EMBODIMENTS

Now the present invention will be described with reference to the drawings which illustrate the preferred embodiments of the present invention.

Figure 1:
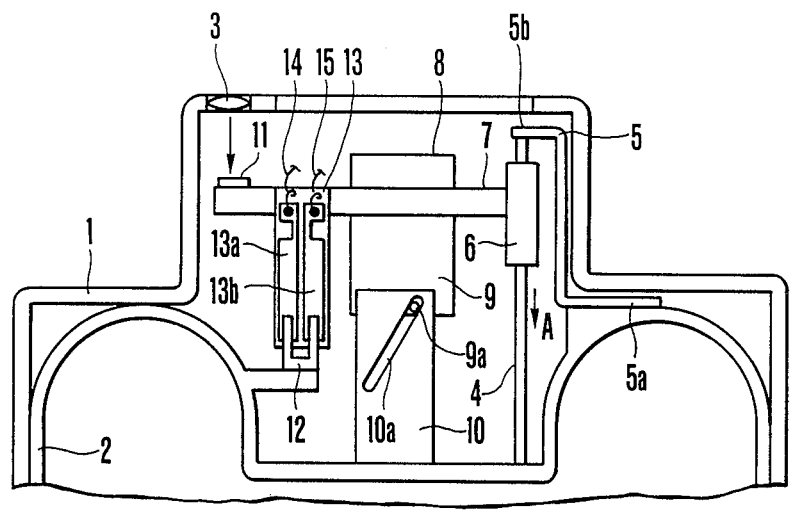
Figure 2:
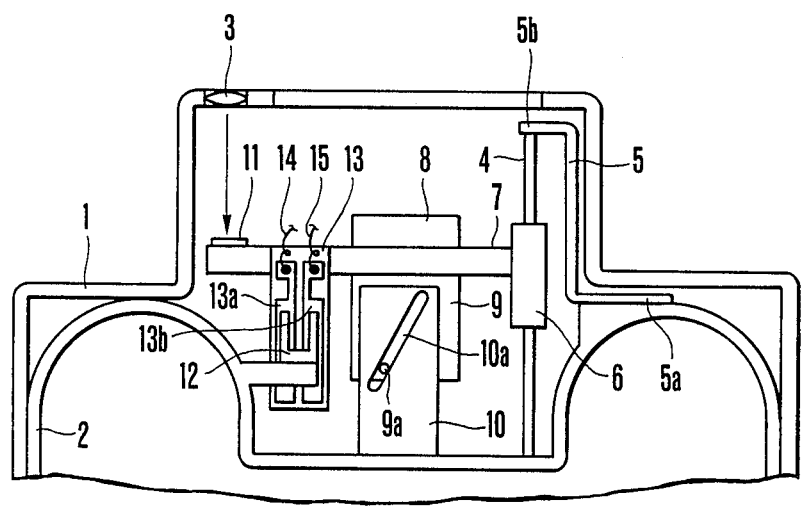

FIGS. 1 and 2 illustrate a camera having a cover 1, a camera body 2, a light measuring lens 3 attached to the cover 1, a supporting bar 4 fixed at its one end on the camera body 2, a bar holding plate 5 fixed at its one end 5a on said camera body 2 and at its other end 5b fixedly connected to said supporting bar 4, a sliding member 6 slidably fitted on said supporting bar 4 to be slidable in forward and backward directions (a direction indicated by an arrow A and a direction opposite thereto), and a shutter AF device 7 having an automatic exposure control mechanism, which has been publicly known per se, fixed to said sliding member 6 so that said device 7 is movable with said sliding member in forward or backward directions relatively to the camera body.

A front group lens-barrel 8 is arranged at the front side of the shutter AF device 7, while a rear group lens-barrel 9 is rotatably mounted on the rear side of said shutter AF device 7. A cam plate 10 having a cam portion 10a is fixed to the camera body 2. The rear group lens-barrel 9 has a pin 9a which is slidably fitted in the cam portion 10a so that when the rear group lens-barrel 9 is moved in forward or backward direction relatively to the camera body 2 said rear group lens-barrel 9 is rotated around its optical axis, owing to the engagement of the pin 9a and the cam portion 10a. A light measuring element 11 consisting of CdS for detecting a luminance of a field to be photographed is mounted on the shutter AF device 7, to receive a light which has passed through the light measuring lens 3. The front group lens-barrel 8 includes a front lens group, not shown, and it is moved in forward or backward direction by the shutter AF device 7 to effect focus adjustment in publicly known manner. The rear group lens-barrel 9 includes a rear lens group, not shown, and the relative distance between the rear lens group and the front lens group is changed by a publicly known mechanism when the rear group lens-barrel 9 is rotated around its optical axis. These front lens group and rear lens group constitute a photographic lens of two-group zooming system, which has been publicly known per se.

The camera further includes a conductive contact piece 12 fixed on the camera body 2, a resistor plate 13 fixed to said shutter AF device 7 and having resistor patterns 13a and 13b formed on the surface thereof, and leads 14 and 15 connected with the resistor patterns 13a and 13b, respectively, at their one ends. The other ends of said leads are connected to an exposure control circuit, which will be hereinafter described. The value of the resistance between the leads 14 and 15 varies, depending upon the relative position of the contact piece 12 and the resistor patterns 13a and 13b and thus these elements constitute a variable resistor. The amount of variation of this variable resistor can be determined, as desired, by selecting desired shape and material of the resistor patterns.

FIG. 1 illustrates a state where the shutter AF device 7, the front group lens-barrel 8 and the rear group lens-barrel 9 have been moved forwardly, so that the lens of two-group zooming system is situated at its longer focal length side. FIG. 2 illustrates a state where the shutter AF device 7, the front group lens-barrel 8 and the rear group lens-barrel 9 have been moved rearwardly, so that the lens of two-group zooming system is situated at its shorter focal length side.

In the state as shown in FIG. 1, where the photographic lens has a longer focal length, its open F-number is larger, while in the state as shown in FIG. 2, where the photographic lens has a shorter focal length, its open F-number is smaller. Accordingly, in order to effect the proper exposure control it is necessary to correct the exposure so that it may correspond to the open F-number, by adjusting the output signal of the light measuring element 11 or the automatic exposure control circuit by some means. In other words, under the conditions where the luminance of the field to be photographed is constant, if a quantity of light incident on the light measuring element in the longer focal length state is equal to that in the shorter focal length state, it is necessary to correct the output signal of the light measuring element or the output signal of the exposure control circuit, otherwise the exposure would become lower in the longer focal length state than in the shorter focal length state. Particularly, in the embodiment where the quantity of light incident on the light measuring element in the longer focal length state is larger, the more correction of the exposure is required. Accordingly, it is required to decrease the quantity of light incident on the light measuring element in the longer focal length state as compared in the shorter focal length state or to effect correction of the output signal of the light measuring element 11 or the output signal of the exposure control circuit by some means.

In the illustrated embodiment, such correction is effected by increasing the value of the resistance between the leads 14 and 15 through the resistor patterns 13a, 13b and the contact piece 12 in the longer focal length state and decreasing the value of said resistance in the shorter focal length state, whereby the exposure is corrected, depending upon the variation of the focal length, to continuously correct the change of the open F-number caused by the variation of the focal length of the photographic lens.

Figure 3:
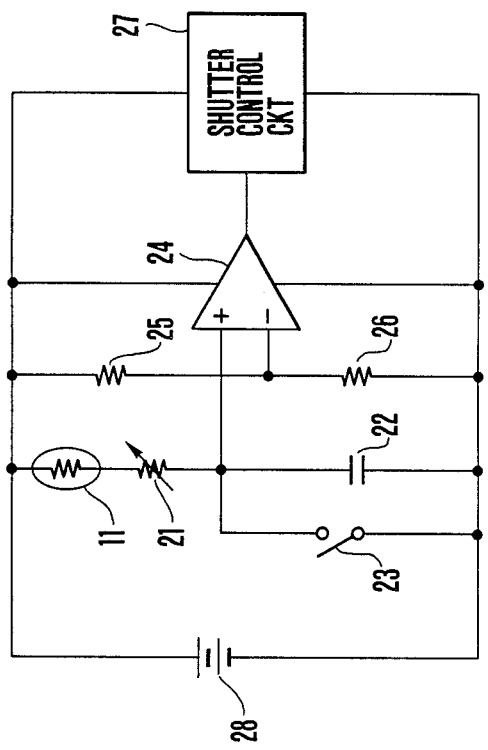
FIG. 3 is a circuit diagram of the exposure control device applied to the camera shown in FIGS. 1 and 2.

FIG. 3 illustrates a circuit of the exposure control device including the variable resistor constituted by the above-mentioned resistor patterns 13a, 13b and contact piece 12. This circuit includes the variable resistor 21, the light measuring element 11 constituted by CdS, and a capacitor 22. These elements constitute a time constant circuit for determining an opening time of a shutter on the basis of a light coming from an object to be photographed. The circuit further includes a release switch 23 which is turned off by shutter releasing operation, a comparator 24, resistors 25 and 26 which are connected to an inverse input terminal of said comparator 24 to form a reference potential, a shutter control circuit 2, which has been publicly known per se, for closing the shutter at the time when a high-level signal is fed thereto from the comparator 24, and a source battery 28.

In the construction as described above, as the shutter starts opening by the shutter releasing operation, the release switch 23 is turned off at once. Then, the capacitor 22, which has been held in reset state up to this moment, is charged, through a circuit including the light measuring element 11 and the variable resistor 21, to a predetermined value for the time corresponding to the luminance of the object to be photographed. When the capacitor 22 has been charged to the predetermined value, the output signal of the comparator 24 is inverted from low level to high level, whereby the shutter control circuit 27 closes the shutter. At this stage, if the resistance of the variable resistor 21 is changed depending upon the variation of the focal length, the charging rate of the capacitor 22 is changed and the shutter opening time is changed accordingly. That is, if the focal length is changed to the longer focal length side, the resistance value is increased, so that the charging rate of the capacitor 22 becomes slower and the shutter opening time is increased, while if the focal length is changed to the shorter focal length side, the resistance value is decreased, so that the charging rate of the capacitor 22 becomes faster and the shutter opening time is decreased. Thus, the proper exposure control can be obtained at any time in response to the continuous variation of the focal length.

It will be understood from the above description that the above embodiment provides an exposure control device in which the correction of the exposure control depending upon the change of the F-number of the photographic lens caused by the variation of the focal length thereof is effected by changing the resistance value of the variable resistor in response to the variation of the focal length of the photographic lens, so that the exposure can be corrected in continuous manner and particularly in case of the zoom lens the precise correction can be effected by the compact mechanism.

Furthermore, in case of a mechanism having complicated characteristics the correction of the exposure can be effected in simple manner by designing the shapes of the resistor patterns of the resistor plate, in accordance with such complicated characteristics.

This correcting device is constituted only by attaching the resistor plate, which forms the correcting means, onto the shutter device and, consequently, the adjustment or the check of the unit can be made in easy manner.

The variable resistor may be formed by any variable resistance member other than the resistor plate as explained above.

Although the description was given to the embodiment in which the resistance value between the leads 14 and 15 is increased in the longer focal length side while the resistance value is decreased in the shorter focal length side, the present invention can be embodied in such form that the resistance value is decreased in the longer focal length side and increased in the shorter focal length side and this variable resistor is connected to the capacitor 22.

Figure 4:
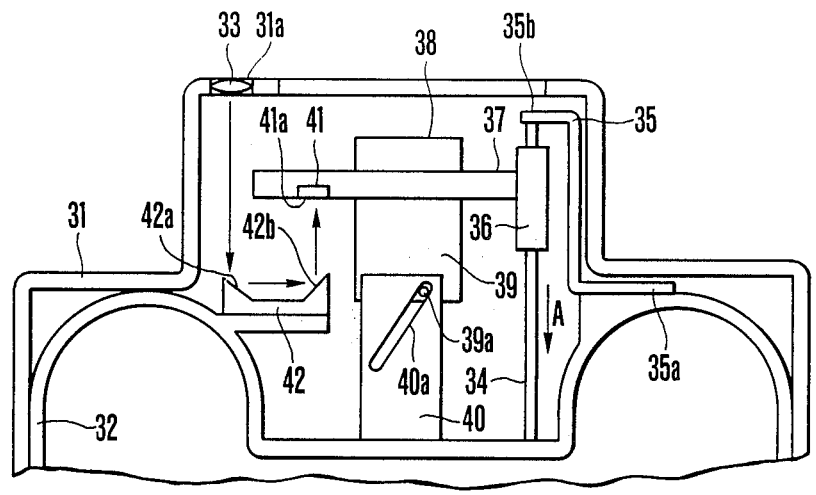
Figure 5:
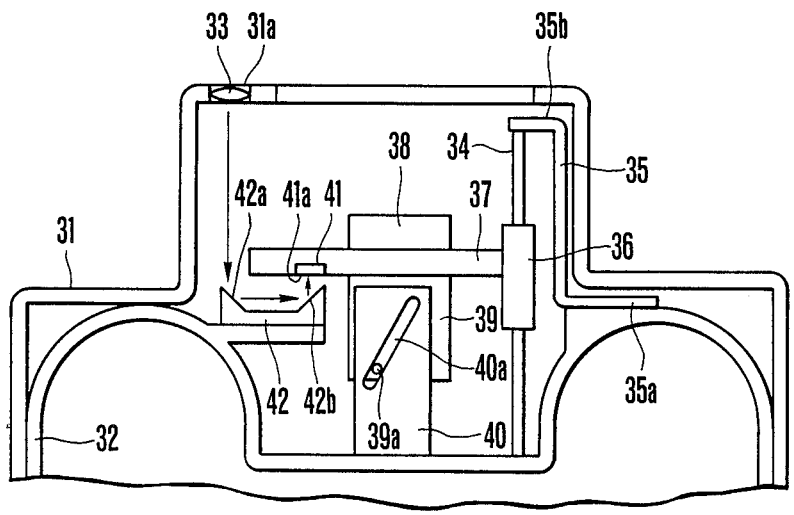

FIGS. 4 and 5 illustrate another embodiment of the present invention. The camera as shown in FIGS. 4 and 5 includes a cover 31, a camera body 32, a light measuring lens 33 attached to the cover 31, a supporting bar 34 fixed at its one end on the camera body 32, a bar holding plate 35 fixed at its one end 35a on said camera body 32 and at its other end 35b fixedly connected to said supporting bar 34, a sliding member 36 slidably fitted on said supporting bar 34 to be slidable in forward and backward directions (a direction indicated by an arrow A and a direction opposite thereto) and a shutter AF device 37 having an automatic exposure control mechanism, which has been publicly known per se, fixed to said sliding member 36 so that said device is movable with said sliding member 36 in forward or backward directions relatively to the camera body.

A front group lens-barrel 38 is arranged at the front side of the shutter AF device 37, while a rear group lens-barrel 39 is rotatably mounted on the rear side of said shutter AF device 37. A cam plate 40 having a cam portion 40a is fixed to the camera body 32. The rear group lens-barrel 39 has a pin 39a which is slidably fitted in the cam portion 40a, so that when the rear group lens-barrel 39 is moved in forward or backward direction relatively to the camera body 32 said rear group lens-barrel 39 is rotated around its optical axis, owing to the engagement of the pin 39a and the cam portion 40a.

A light measuring element 41 for detecting a luminance of a field to be photographed is mounted on the shutter AF device 37 and its light receiving face is directed to a side of a film of the camera. A reflector plate 42, which has a concave shape in section and includes reflecting surfaces 42a and 42b, is fixed on the camera body 32 and a light coming from the field to be photographed and passing through the light measuring lens 33 is reflected by the reflecting surfaces 42a and 42b as indicated by arrows in FIG. 4 and directed to the light receiving face 41a of said light measuring element 41.

The front group lens-barrel 38 includes a front lens group, not shown, and it is moved in forward or backward direction by the shutter AF device 37 to effect focus adjustment in publicly known manner. The rear group lens-barrel 39 includes a rear lens group, not shown, and the relative distance between the rear lens group and the front lens group is changed by a publicly known mechanism when the rear group lens-barrel 9 is rotated around its optical axis. These front lens group and rear lens group constitute a photographic lens of two-group zooming system, which has been publicly known per se.

FIG. 4 illustrates a state where the shutter AF device 37, the front group lens-barrel 38 and the rear group lens barrel 39 have been moved forwardly, so that the lens of two-group zooming system is situated at its longer focal length side. FIG. 5 illustrates a state where the shutter AF device 37, the front group lens-barrel 38 and the rear group lens-barrel 39 have been moved rearwardly, so that the lens of two-group zooming system is situated at its shorter focal length side.

In the state as shown in FIG. 4, where the photographic lens has a longer focal length, its open F-number is larger, while in the state as shown in FIG. 5, where the photographic lens has a shorter focal length, its open F-number is smaller. Accordingly, in order to effect the proper exposure control it is necessary to correct the output signal of the light measuring element 41 so that it may correspond to the open F-number, as explained with reference to the above-mentioned embodiment. In other words, under the conditions where the luminance of the field to be photographed is constant, if a quantity of light incident on the light measuring element in the longer focal length state is equal to that in the shorter focal length state, it is necessary to correct the output signal of the light measuring element, otherwise the exposure would become lower in the longer focal length state than in the shorter focal length state. Accordingly, it is required, for example, to decrease the quantity of light incident on the light measuring element in the longer focal length state of the photographic lens as compared in the shorter focal length state or to effect correction of the output signal of the light measuring element fed into the exposure control circuit of the automatic exposure control device by some means.

In the embodiment as illustrated in FIGS. 4 and 5, the light coming from the light measuring lens 33 passes through an optical path reflected by the reflector plate 42 and incident onto the light measuring element 41 and the length of the optical path from the light measuring lens 33 to the light receiving surface 41a of the light measuring element 41 can be changed so that the length of said optical path can be increased when the photographic lens is situated at the longer focal length side as compared with when the photographic lens is situated at the shorter focal length side. Accordingly, under the condition where the luminance of the field to be photographed is constant, the quantity of light introduced to the light measuring element is decreased in the longer focal length state as shown in FIG. 4. That is, the length of the optical path from the light measuring lens to the light measuring element is changed, in accordance with the variation of the focal length, so that the quantity of light reaching the light measuring element is changed in response to the change of the open F-number of the photographic lens, whereby the exposure control is properly corrected in response to the change of the open F-number caused by the variation of the focal length of the photographic lens.

Although the description was given to the embodiment in which the light measuring element 41 is moved in order to change the length of the light measuring path, the present invention can be embodied in the form in which the reflector plate 42 is arranged to be movable, depending upon the variation of the focal length in order to adjust the length of the light measuring path.

It will be understood that the present invention provides a device for continuously and properly correcting the exposure in response to the change of the open F-number of the photographic lens caused by the variation of the focal length. Thus, it is possible to effect the photographing at a proper exposure.

What is claimed is:

1. An exposure control device for a camera having a photographic system of variable focal length type, comprising:
    (A) exposure control means for controlling an exposure on the basis of a light coming from an object to be photographed and passing through an optical path different from that of the photographic system; and
    (B) correcting means for correcting the exposure depending upon a change of an open F-number of said photographic system caused by a variation of the focal length thereof, said correcting means including means for changing an optical path for measuring the light coming from the object to be photographed, said means for changing the optical path including means associated with the movement of said photographic system at the time of the variation of the focal length thereof to move the light measuring means, light reflector means, and means to move the light measuring means arranged to move said light measuring means away from said reflector means when the focal length of said photographic system is varied to its longer focal length side and to move said light measuring means toward said reflector means when the focal length of said photographic lens is varied to its shorter focal length side.

2. An exposure control device for a camera having a photographic system of variable focal length type, comprising:
    (A) exposure control means for controlling an exposure on the basis of a light coming from an object to be photographed and passing through an optical path different from that of the photographic system;
    (B) correcting means for correcting the operation of said exposure control means in response to a change of an open F-number of said photographic system caused by a variation of the focal length thereof;
        said correcting means including means for changing a length of an optical path for measuring the light coming from the object to be photographed;
        said means for changing the length of the light measuring optical path including:
        (a) a light measuring portion arranged to be moved in response to the variation of the focal length, and
        (b) reflector means for reflecting the light coming from the object to be photographed to direct said light toward said light measuring portion.

3. An exposure cnntrol device according to claim 2, in which said correcting means includes means for associating said light measuring portion with said photographic system which is arranged to move said light measuring portion away from said reflector means in response to the variation of the focal length of said photographing system to its longer focal length side and to move said light measuring portion toward said reflector means in response to the variation of the focal length of said photographic system to its shorter focal length side.

4. An exposure control device for a camera having a photographic system of variable focal length type, comprising:
    (A) exposure control means for controlling an exposure on the basis of a light coming from an object to be photographed and passing through an optical path different from that of the photographic system; and
    (B) correcting means, which includes a variable resistor means, for continuously correcting the operation of said exposure control means in response to a variation of the focal length of said photographic system, said correcting means includes means for changing an optical path for measuring the light coming from the object to be photographed, said means for changing the optical path including means associated with the movement of said photographic system at the time of the variation of the focal length thereof to move said light measuring means.

5. An exposure control device according to claim 4, in which said means for changing the optical path includes light reflector means, and
    said means to move the light measuring means is arranged to move said light measuring portion away from said reflector means when the focal length of said photographic system is varied to its longer focal length side and to move said light measuring means toward said reflector means when the focal length of said photographic lens is varied to its shorter focal length side.

6. A camera comprising:
    (A) Exposure control means for controlling an exposure operation on the basis of an exterior light incident through an optical path different from a photographic optical path, and (B) correction means for correcting the operation of said exposure control means corresponding to changes in the open F value accompanying changes in the focal length of a photographic optical means, said correction means including light measuring means having reflection means forming a light measuring optical path variable in response to the changes in the open F value.

7. A camera according to claim 6, wherein said light measuring means is designed to elongate said light measuring optical path in response to the change in the focal length of said photographic optical means to a longer focal length side, and to shorten the light measuring optical path in response to the change in the focal length to a shorter focal length side.

8. A camera according to claim 6, wherein said light measuring means includes light receiving means for receiving the incident light, said light receiving means is designed to depart from said reflection means in response to the change of the focal length of said photographic optical means to a longer focal length side, and to approach the reflection means in response to the change of the focal length to a shorter focal length side.

9. A camera comprising:
(A) Exposure control means for controlling an exposure operation on the basis of an exterior incident light through an optical path different from a photographic optical path,
(B) correction means for correcting the operation of said exposure control means in response to changes in a focal length of a photographic optical means,
said correction means including light measuring means having reflection means forming a light measuring path variable in response to the changes in the focal length.

10. A camera according to claim 9, wherein said light measuring means is designed to elongate said light measuring optical path in response to the change in the focal length of said photographic optical means to a longer focal length side, and to shorten the light measuring optical path in response to the change in the focal length to a shorter focal length side.

11. A camera according to claim 9, wherein said light measuring means includes light receiving means for receiving the incident light, said light receiving means is designed to depart from said reflection means in response to the change of the focal length of said photographic optical means to a longer focal length side, and to approach the reflection means in response to the change of the focal length to a shorter focal length side.

* * * * *

UNITED STATES PATENT AND TRADEMARK OFFICE
CERTIFICATE OF CORRECTION

PATENT NO. : 4,777,508

DATED : October 11, 1988

INVENTOR(S) : Chikara Aoshima, et al.

It is certified that error appears in the above-identified patent and that said Letters Patent is hereby corrected as shown below:

AT [56] IN THE REFERENCES CITED

Insert section --FOREIGN PATENT DOCUMENTS-- centered as a heading.

Insert --58-182623 10/1983 Japan-- thereunder.

COLUMN 1

Line 12, "luminnnce" should read --luminance--; and

Line 22, "photograhic" should read --photographic--.

COLUMN 4

Line 6, "in" should read --to--; and

Line 33, "circuit 2" should read --circuit 27--.

COLUMN 6

Line 6, "rear group lens-barrel 9" should read --rear group lens-barrel 39--;

Line 13, "lens barrel 39" should read --lens-barrel 39--; and

Line 40, "in" should read --to--.

UNITED STATES PATENT AND TRADEMARK OFFICE
CERTIFICATE OF CORRECTION

PATENT NO. : 4,777,508

DATED : October 11, 1988

INVENTOR(S) : Chikara Aoshima, et al.

It is certified that error appears in the above-identified patent and that said Letters Patent is hereby corrected as shown below:

COLUMN 7

Line 67, "cnntrol" should read --control--.

Signed and Sealed this

First Day of August, 1989

Attest:

DONALD J. QUIGG

Attesting Officer

Commissioner of Patents and Trademarks